United States Patent
Rose et al.

(10) Patent No.: US 6,281,880 B1
(45) Date of Patent: Aug. 28, 2001

(54) COMBINING INPUT/OUTPUT PATHS FOR INFRA-RED REMOTE DEVICE INPUTS

(75) Inventors: Jerry Michael Rose; Kenneth A. Jaramillo, both of Phoenix, AZ (US)

(73) Assignee: VLSI Technology, Inc., San Jose, CA (US)

( * ) Notice: Subject to any disclaimer, the term of this patent is extended or adjusted under 35 U.S.C. 154(b) by 0 days.

(21) Appl. No.: 09/097,887

(22) Filed: Jun. 15, 1998

(51) Int. Cl.$^7$ ..................................................... G09G 5/08
(52) U.S. Cl. .............................. 345/158; 359/109; 710/73
(58) Field of Search .................................... 345/158, 175; 359/109, 142, 145; 710/73

(56) References Cited

U.S. PATENT DOCUMENTS

| | | | | |
|---|---|---|---|---|
| 5,162,783 | * | 11/1992 | Moreno .................................. | 345/175 |
| 5,557,751 | * | 9/1996 | Banman et al. ...................... | 359/109 |
| 5,721,842 | * | 2/1998 | Beasley et al. ....................... | 395/311 |
| 5,734,487 | * | 3/1998 | Rossi ..................................... | 359/145 |
| 6,084,638 | * | 7/2000 | Hare et al. ............................ | 348/552 |
| 6,097,520 | * | 8/2000 | Kadnier ................................ | 359/142 |

* cited by examiner

Primary Examiner—Steven Saras
Assistant Examiner—Uchendu O. Anyaso
(74) Attorney, Agent, or Firm—Wagner, Murabito & Hao LLP

(57) ABSTRACT

An electronic device for receiving infra-red inputs from remote units and propagating the inputs to an intelligent controller circuit. In one embodiment, the present invention receives the infra-red energy emitted from different remote units in a single infra-red receiver circuit. This embodiment then generates digital data signals responsive to the infra-red energy, and propagates the digital data signals through a single external single-pin bus to an integrated circuit. The integrated circuit contains circuitry therein to decode control signals from a variety of different remote units. In this embodiment, the integrated circuit's internal bus is coupled to the single external single-pin bus. The internal bus is commonly coupled to all remote control decoder circuits within the integrated circuit. In this embodiment, the integrated circuit decodes keyboard digital data signals into keyboard control signals for the intelligent controller unit, mouse digital data signals into mouse control signals for the intelligent controller unit, and remote control digital data signals into remote-control control signals for the intelligent controller unit. By integrating the decoder circuits into a single integrated circuit and by sharing a single external bus for the remote control signals, significant size reductions are provided for set-top-boxes and other electronic devices.

18 Claims, 4 Drawing Sheets

COMBINING INPUT/OUTPUT PATHS FOR INFRA-RED REMOTE DEVICE INPUTS

TECHNICAL FIELD

The present invention relates to the field of consumer electronics. In particular, the present invention pertains to an integrated circuit that receives signals from infra-red peripheral (remote) devices.

BACKGROUND ART

An infra-red remote device is used to transmit commands and other signals to a remote electronic device. An infra-red remote unit functions by transmitting infra-red light from the transmitter unit to a receiver in the target device such as a set-top-box. The infra-red light is varied in a predetermined code in response to the operator's command or as a function of the information being transmitted. For example, a keyboard that is attached to a computer system by a cable communicates to the computer system by translating the keyboard entries into electrical signals that are transmitted through the cable. The electric signals are transformed into a data signal that is understood and implemented by the computer system. An infra-red remote keyboard performs in an analogous manner, but instead translates the keyboard entries into infra-red electromagnetic energy that is transmitted to a set-top-box. The set-top-box then transforms the infra-red signal into a data signal that is understood and implemented by the computer system.

The use of infra-red remote units to transmit commands from the operator to an electronic device includes familiar applications such as television remote controls, and cable television and satellite television control boxes. In addition, the use of infra-red remotes is expanding to include many new applications. Computer peripherals, such as computer keyboards (as discussed above), cursor directing devices (e.g., a mouse device), and infra-red printers, are increasingly using infra-red to communicate with computer systems in lieu of a cable connection. Also, hand-held devices, such as those commonly referred to as "palm-tops," rely on infra-red signals to download quantities of information into computer systems. Infra-red remote units are thereby advantageous because they eliminate the cables between devices that would otherwise be needed. Infra-red units are also advantageous because they facilitate greater freedom of movement by the user. Thus, the use of infra-red remote units provides a convenient and user-friendly method of communicating with electronic systems, especially as the complexity of both the receiving unit (e.g., a computer system) and the transmitting unit (e.g., a palm-top) increases.

The growing number of applications of infra-red remote units and peripheral devices consequently increases the number of different remote units and peripherals utilized by the operator (e.g., a consumer). For example, a typical consumer may have an infra-red remote unit for transmitting commands to a television, another remote unit for a cable or satellite set-top-box, and another remote unit for a multimedia system such as a video-cassette recorder (VCR), as well as a remote infra-red mouse, keyboard, and printer. Each of the target devices, such as the television, VCR and computer system, typically incorporates its own separate infra-red receiver circuit. With the addition of other devices such as a computer system or a palm-top, more infra-red remote units and infra-red receiving units will be added. Thus, a drawback to the prior art is that a consumer typically finds it necessary to use more than one receiver circuit to receive and process the different infra-red signals.

With reference to Prior Art FIG. 1, one prior art approach to address this drawback is illustrated. One set-top box 100 contains two infra-red receiver circuits, 120 and 130, which are located behind one transparent infra-red receiver window 110. Infra-red receiver circuit 120 receives infra-red signals from remote control device 105, and infra-red receiver circuit 130 receives infra-red signals from remote mouse 106 and remote keyboard 107. The remote control signal from infra-red receiver circuit 120 is transmitted through input/output (I/O) bus 125 to integrated circuit 150. The I/O bus 125 is connected to integrated circuit 150 using pin 144.

With reference still to Prior Art FIG. 1, the mouse signal from infrared receiver circuit 130 is digitized and transmitted through line 131 to PS/2 converter circuit 133, which converts the mouse signal into a signal conforming to the PS/2 communications standard. The mouse signal is then transmitted through I/O bus 135 to integrated circuit 150. Similarly, the keyboard signal is digitized and transmitted from infra-red receiver circuit 130 through line 132 to PS/2 converter circuit 133, where the keyboard signal is converted to the PS/2 communications standard. The keyboard signal is then transmitted through I/O bus 136 to integrated circuit 150. The I/O bus 136 is connected to integrated circuit 150 by two pins 140 and 141, and I/O bus 135 is similarly connected to integrated circuit 150 by two pins 142 and 143. Integrated circuit 150 decodes the remote control, mouse and keyboard signals so that the signals can be processed by a controller, such as a microprocessor (not shown).

The prior art approach illustrated by Prior Art FIG. 1 thus combines two infra-red receiver circuits into one set-top-box. However, a disadvantage to this prior art approach is that the set-top-box contains duplicate hardware. For example, there are two infra-red receivers, three I/O buses, and five pins. The duplicate hardware increases the cost of production and materials as well as the size of the integrated circuits within the set-top-box. As a result, the prior art approach described above is also at a disadvantage from the perspective of consumer preferences for lower prices and miniaturization.

With reference now to Prior Art FIG. 2, another prior art approach to address the drawbacks identified above is illustrated. This prior art approach is similar to the one described above in conjunction with Prior Art FIG. 1, but instead employs one infra-red receiver circuit 220 inside set-top-box 200 instead of two infra-red receiver circuits. The infra-red receiver circuit contains a filter that is capable of identifying the type of signal that is received from the infra-red remote unit. Depending on the type of signal, it then takes a different path through set-top-box 200.

With reference still to Prior Art FIG. 2, the remote control signal from infra-red receiver circuit 220 is transmitted through I/O bus 225 to integrated circuit 250. The I/O bus 225 is connected to integrated circuit 250 using pin 244. The mouse signal from infra-red receiver circuit 220 is transmitted through line 231 to PS/2 converter circuit 233, which converts the mouse signal into a signal conforming to the PS/2 communications standard. The mouse signal is then transmitted through I/O bus 235 to integrated circuit 250. Similarly, the keyboard signal is transmitted from infra-red receiver circuit 220 through line 232 to PS/2 converter circuit 233, where the keyboard signal is converted to the PS/2 communications standard. The keyboard signal is then transmitted through I/O bus 236 to integrated circuit 250. The I/O bus 235 is connected to integrated circuit 250 by two pins 242 and 243, and I/O bus 236 is connected to integrated circuit 250 by two pins 240 and 241. As with the first prior art technique, integrated circuit 250 decodes the remote control, mouse and keyboard signals so that the signals can be processed by a controller, such as a microprocessor (not shown).

Thus, the prior art approach described by Prior Art FIG. 2 eliminates one duplicate piece of hardware, i.e., one of the infra-red receivers, but still requires duplicates of some of the other hardware. Specifically, there are still three I/O buses and five pins on integrated circuit 250. Thus, as with the approach discussed above in conjunction with Prior Art FIG. 1, the duplicate hardware increases material and production costs and takes up space within the set-top-box, and therefore does not address consumer preferences.

Thus, a need exists for an electronic device that combines the cost-effectiveness of reduced hardware requirements with the convenience of a single set-top-box or other electronic product. A further need exists for an electronic device that provides efficient communication of infra-red signals received from remote units to the signal-decoding hardware for each of the infra-red remote devices. A still further need exists for an electronic device that satisfies the above needs and is compatible with existing infra-red remote units.

These and other objects and advantages of the present invention will become obvious to those of ordinary skill in the art after having read the following detailed description of the preferred embodiments which are illustrated in the various drawing figures.

DISCLOSURE OF THE INVENTION

The present invention provides an electronic device that reduces hardware costs while maintaining the convenience of a single set-top-box. The present invention also provides an electronic device that uses a single infra-red receiver and a single input/output path from the infra-red receiver to the signal-decoding hardware for all infra-red remote devices. The present invention further provides an electronic device that is compatible with existing remote units. The invention described herein provides an electronic device for receiving infra-red inputs from more than one type of remote unit and thereafter propagating the digitized input signals to an intelligent controller circuit.

Specifically, in one embodiment, the present invention receives the infra-red energy emitted from different remote units in a single infra-red receiver circuit. This embodiment then generates digital data signals responsive to the infra-red energy, and propagates the digital data signals through a single external single-pin bus to an integrated circuit. The integrated circuit contains circuitry therein to decode control signals from a variety of different remote units. In this embodiment, the integrated circuit is coupled to the single external single-pin bus. The internal bus is commonly coupled to all remote control decoder circuits within the integrated circuit. In this embodiment, the integrated circuit decodes keyboard digital data signals into keyboard control signals for the intelligent controller unit, mouse digital data signals into mouse control signals for the intelligent controller unit, and remote control digital data signals into remote-control control signals for the intelligent controller unit. By integrating the decoder circuits into a single integrated circuit and by sharing a single external bus for the remote control signals, significant size reductions are provided for set-top-boxes and other electronic devices.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 3:
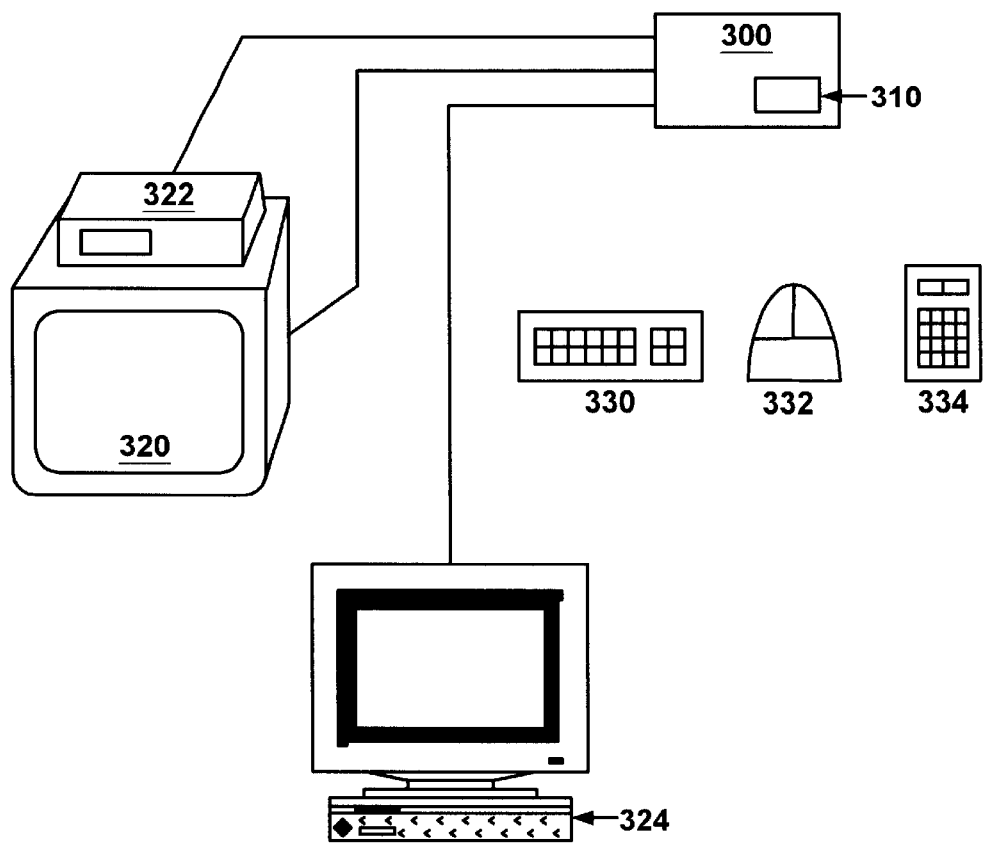
FIG. 3 is an illustration of a set-top-box system using remote units and peripherals in accordance with one embodiment of the present invention.

With reference to FIG. 3, a front view of one embodiment of the present invention is illustrated. Set-top-box 300 is an electronic device utilizing one or more processors (not shown) that receives and processes the information and instructions transmitted by infra-red remote units. Set-top-box 300 contains infra-red receiver window 310. In this embodiment, the set-top-box uses only a single window. Set-top-box 300 is coupled to one or more devices such as television 320, video-cassette recorder 322, computer system 324, and other like devices that can be remotely controlled using infra-red remote units.

With reference still to FIG. 3, various infra-red remote units, such as keyboard 330, cursor directing device (e.g., mouse) 332, and remote control 334 and the like, are employed to transmit an infra-red signal to set-top-box 300. Keyboard 330 and mouse 332 exemplify, respectively, an alphanumeric input device and a cursor control device used for communicating information and command selections to computer systems and the like. Remote control 334 exemplifies one or more devices used with audio-visual multimedia systems including Motion Pictures Expert Group (MPEG) format data, the internet, cable television, satellite television, palm-tops, and like applications. As such, it is appreciated that in the discussion herein, remote control 334 can represent more than one infra-red remote unit.

Keyboard 330, mouse 332 and remote control 334 emit infra-red light that is received by set-top-box 300 through transparent infra-red receiver window 310. Each type of remote unit emits infra-red light that is characteristic of the type of remote unit; for example, the rate at which the infra-red light is pulsed from the remote unit may vary as a function of the type of remote unit. However, each type of remote unit emits infra-red light that is approximately of the same frequency band, or wave length range, as the other types of remote units.

Figure 1:
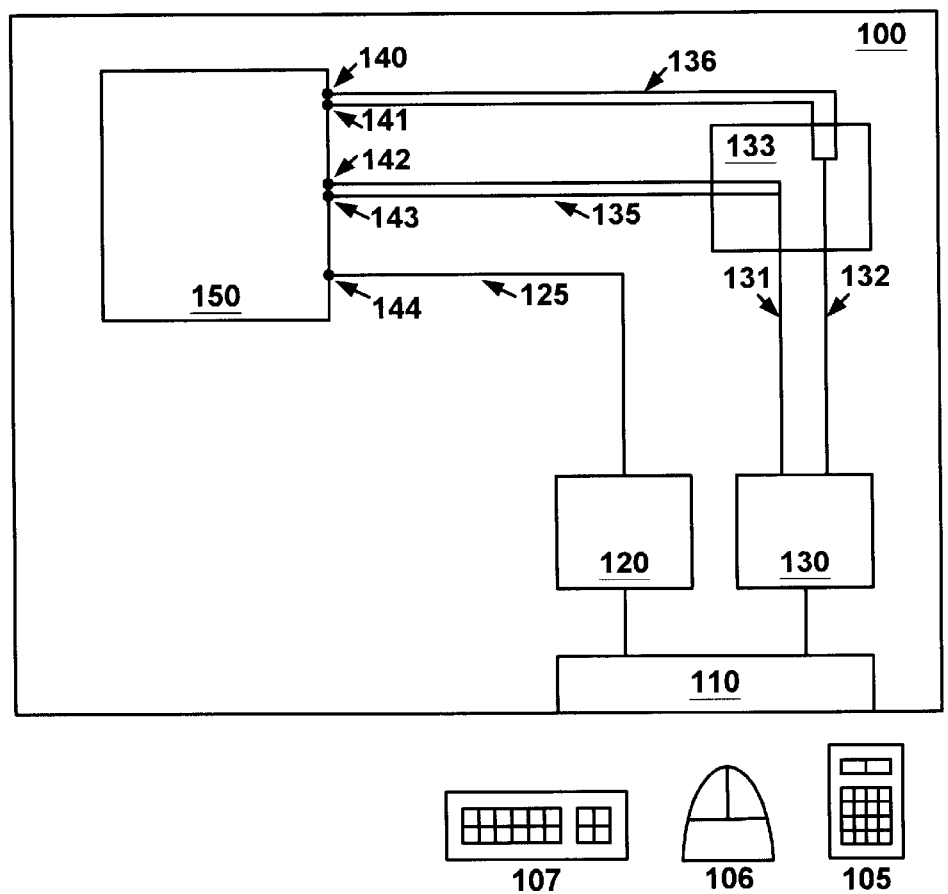
FIG. 1 is an illustration of a block diagram of the internal hardware of a first prior art set-top-box.
Figure 4:
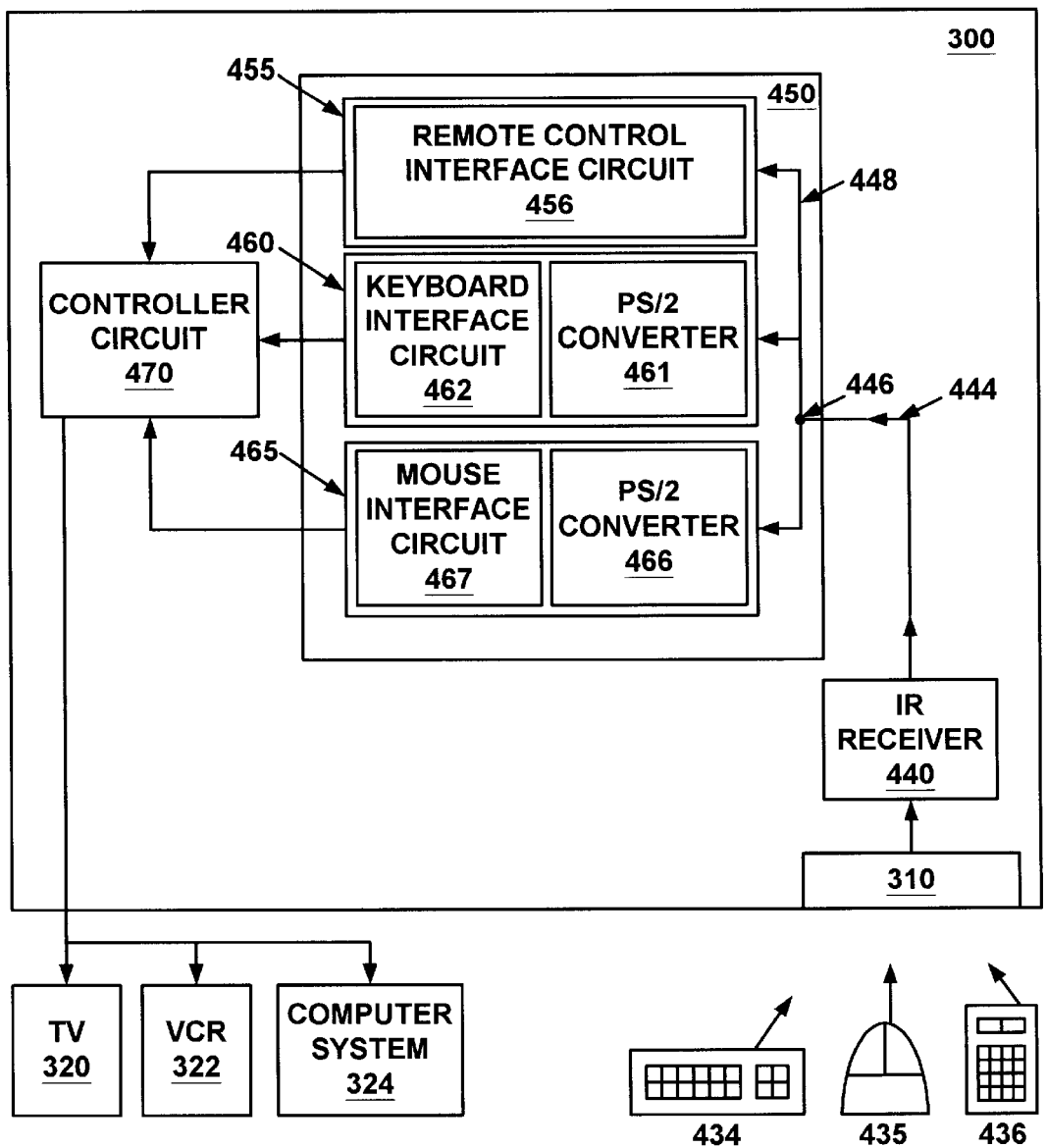
FIG. 4 is a block diagram of the internal hardware of a set-top-box in accordance with one embodiment of the present invention.

With reference now to FIG. 4, a block diagram of the circuitry of set-top-box 300 is shown, illustrating the hardware components of one embodiment of the present invention. In this embodiment, infra-red receiver circuit 440 is located behind infra-red receiver window 310. In this embodiment of the present invention, a single infra-red receiver circuit is used, unlike embodiments of prior art devices such as those described above in conjunction with Prior Art FIG. 1. Various infra-red remote units, such as keyboard 434, mouse 435, remote control 436, or the like, emit infrared light that is transmitted through infra-red receiver window 310. Infra-red receiver circuit 440 translates the infra-red signals received through infra-red receiver window 310 into a digital signal representative thereof.

Figure 2:
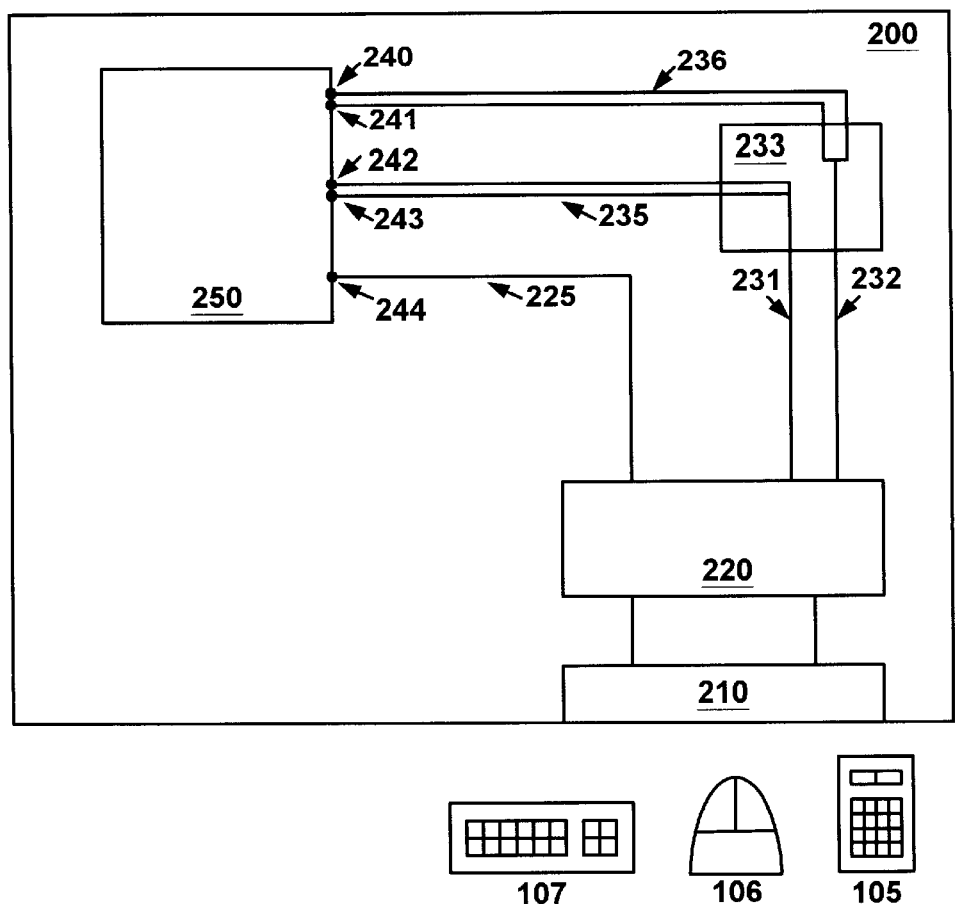
FIG. 2 is an illustration of a block diagram of the internal hardware of a second prior art set-top-box.

With reference still to FIG. 4, in this embodiment infra-red receiver circuit 440 is coupled to infra-red peripheral integrated circuit 450 by way of external bus 444, which is a bus external to integrated circuit 450. External bus 444 is connected to internal bus 448, which is a bus internal to integrated circuit 450, by pin 446. In the present embodiment of the present invention, external bus 444 is a single-pin bus. Thus, the present embodiment of the present invention reduces the amount of hardware, specifically the number of input/output bus lines and the number of pins and input/output pads, relative to the embodiments of the prior art devices described above in conjunction with Prior Art FIGS. 1 and 2.

In this embodiment, internal bus 448 of FIG. 4 is coupled to signal detection blocks 455, 460 and 465 within integrated circuit 450. In this embodiment, signal detection block 455 is comprised of remote control interface circuit 456. In this embodiment, signal detection block 460 is comprised of PS/2 converter circuit 461. In one embodiment, the keyboard interface is managed by PS/2 converter circuit 461 coupled to keyboard interface circuit 462. In an alternative embodiment, the keyboard interface is managed by a software entity. In this embodiment, signal detection block 465 is comprised of PS/2 converter circuit 466. In one embodiment, the mouse interface is managed by PS/2 converter circuit 466 coupled to mouse interface circuit 467. In an alternative embodiment, the mouse interface is managed by a software entity.

The present invention advantageously integrates the detection logic for the mouse, the keyboard and the remote control devices onto the single integrated circuit device or "chip" 450, thereby saving space within the set-top-box. Also, by having all signals from the infra-red remote units share the same data path (i.e., external bus 444) and input pin 446, the package size of integrated circuit 450 can be reduced and the bus size of external bus 444 is reduced, thereby taking up less space within the set-top-box.

In this embodiment, infra-red peripheral integrated circuit 450 is coupled to controller circuit 470. Controller circuit 470 is a microprocessor, a micro-controller or like device for processing the information and instructions that originated from infra-red keyboard 434, mouse 435, remote control 436, and the like.

Continuing with reference to FIG. 4, an example of the present embodiment in use is given. The operator utilizes infra-red keyboard 434, mouse 435, and remote control 436 to transmit a command to set-top-box 300. As previously discussed in conjunction with FIG. 3, keyboard 434, mouse 435, and remote control 436 exemplify one or more devices for communicating commands and other information to the set-top-box by way of infra-red light. It is appreciated that multiple and different types of infra-red remote units or devices can be used with the present invention. As described above, the infra-red light emitted by the remote unit is characteristic of the type of remote unit.

The infra-red light passes through infra-red receiver window 310 to infra-red receiver circuit 440 of FIG. 4. As described above, although the infra-red light will be unique in some characteristics, the frequency of the infra-red light does not vary significantly as a function of the type of remote unit. Hence, the single infra-red receiver used in this embodiment is capable of receiving the infra-red light from more than one infra-red remote unit regardless of the type of remote unit that emitted the infra-red light. In this embodiment, infra-red receiver circuit 440 does not identify the characteristics of the infra-red light, but simply receives the infra-red light regardless of the type of remote unit that emitted the infra-red light. In this embodiment, the infra-red light received by infra-red receiver circuit 440 is converted to a digital signal by an analog-to-digital converter that is located internal to the infra-red receiver. The digital signals retain the characteristics of the infra-red light that identifies the type of remote unit that was used to emit the infra-red light.

With reference still to FIG. 4, the digital data signals are transmitted by external bus 444 to internal bus 448 within integrated circuit 450. External bus 444 is coupled to internal bus 448 via pin 446. By having all digital data signals share the same external bus 444 and pin 446, the present invention reduces the package size of integrated circuit 450 and the bus size of external bus 444, thereby taking up less space in the set-top-box.

Continuing with reference to FIG. 4, in this embodiment the digital data signals are carried by internal bus 448 to all of the signal detection blocks 455, 460 and 465 within integrated circuit 450 simultaneously. The signal detection blocks have the capability of recognizing the type of data signal based on the characteristic of the signal as described above. That is, the signal detection blocks can each determine whether the digital data signals are associated with keyboard 434, mouse 435, or remote control 436. The appropriate signal detection block then acts on the digital data signals. The present invention thus integrates the detection logic for the keyboard, mouse and remote control devices into the single integrated circuit 450, thereby saving space within the set-top-box.

Continuing with reference to FIG. 4, in this embodiment signal detection block 455 receives the digital data signals over internal bus 448 and identifies whether or not they are remote control signals. If they are, remote control interface circuit 456 decodes the digital data signals into remote control-specific control signals that can be recognized and processed by controller circuit 470, where controller circuit 470 is a microprocessor, a micro-controller, or like device.

In this embodiment, signal detection block 460 of FIG. 4 receives the same digital data signals and identifies whether or not they are keyboard signals. If they are, PS/2 converter circuit 461 transforms the digital data signals into signals conforming to the PS/2 communications standard, which are processed by controller circuit 470, where controller circuit 470 is a microprocessor, a micro-controller, or like device. In an alternative embodiment, a keyboard interface decodes the PS/2-converted data signals into keyboard-specific control signals that can be recognized and processed by controller circuit 470. In one embodiment, the keyboard interface is provided by keyboard interface circuit 462. In another embodiment, the keyboard interface is provided by a software entity.

In this embodiment, signal detection block 465 of FIG. 4 also receives the same digital data signals and identifies whether or not they are mouse signals. If they are, PS/2 converter circuit 466 transforms the digital data signals into signals conforming to the PS/2 communications standard, which are processed by controller circuit 470, where controller circuit 470 is a microprocessor, a micro-controller, or like device. In an alternative embodiment, a mouse interface then decodes the PS/2-converted data signals into mouse-specific control signals that can be recognized and processed by controller circuit 470. In one embodiment, the mouse interface is provided by mouse interface circuit 467. In another embodiment, the mouse interface is provided by a software entity.

With reference still to FIG. 4, controller circuit 470 is designed to process and implement the instructions from the device-specific control signals transmitted by integrated circuit 450. Controller circuit 470 is connected to one or more devices such as television (TV) 320, video-cassette recorder (VCR) 322, computer system 324, and the like.

In summary, the present invention utilizes only one set-top-box to receive the infra-red signals emitted by the various types of infra-red remote units being utilized for consumer applications, such as televisions, computer systems, and palm-tops. The present invention reduces the amount of hardware required to receive and process the various types of signals, and utilizes an integrated circuit to process the signals according to the type of infra-red remote unit that transmitted the signal.

The present invention advantageously integrates the detection logic for the mouse, the keyboard and the remote control devices onto a single integrated circuit device or "chip", thereby saving space within the set-top-box. Also, by having all signals from the infra-red remote units share the same data path (i.e., the external bus) and input pin, the package size of the integrated circuit can be reduced and the bus size of the external bus is reduced, thereby taking up less space within the set-top-box.

The present invention thus provides an electronic device that reduces hardware costs while maintaining the convenience of a single set-top-box. The present invention further provides an electronic device that uses a single infra-red receiver and a single input/output path from the infra-red receiver to the signal-decoding hardware for all infra-red remote devices. The present invention further provides an electronic device that is compatible with existing remote units.

The preferred embodiment of the present invention, combined input/output paths for infra-red remote device inputs, is thus described. While the present invention has been described in particular embodiments, it should be appreciated that the present invention should not be construed as limited by such embodiments, but rather construed according to the following claims.

What is claimed is:

1. An electronic device comprising:
   a) a single infra-red receiver circuit for receiving infra-red energy emitted from remote units and for generating data signals responsive thereto;
   b) a single external single-pin bus coupled to said infra-red receiver circuit for propagating said data signals; and
   c) an integrated circuit coupled to said single external single-pin bus for decoding said data signals for an intelligent controller circuit, said integrated circuit comprising:
   an internal bus coupled to said single external single-pin bus;
   a keyboard interface coupled to said internal bus to receive said data signals and to identify keyboard data signals, wherein said keyboard interface decodes said keyboard data signals into keyboard control signals for said intelligent controller circuit;
   a mouse interface coupled to said internal bus to receive said data signals and to identify mouse data signals, wherein said mouse interface decodes said mouse data signals into mouse control signals for said intelligent controller circuit; and
   a remote-control interface circuit coupled to said internal bus to receive said data signals and to identify remote-control data signals, wherein said remote-control interface circuit decodes said remote-control data signals into remote-control control signals for said intelligent controller circuit.

2. An electronic device as described in claim 1 wherein said intelligent controller circuit is a microprocessor.

3. An electronic device as described in claim 1 wherein said intelligent controller circuit is a micro-controller.

4. An electronic device as described in claim 1 wherein said remote units comprise: a mouse unit; a keyboard unit; and a remote control unit.

5. An electronic device as described in claim 1 wherein said integrated circuit further comprises a PS/2 converter circuit coupled between said single external single-pin bus and said mouse and keyboard interfaces, said PS/2 converter circuit for transforming said mouse and keyboard data signals to signals of the PS/2 communications standard and wherein said mouse data signals and said keyboard data signals both conform to the PS/2 communications standard.

6. A set-top-box device comprising:
   a) an intelligent controller circuit for controlling the display of media information;
   b) a single infra-red receiver circuit for receiving infra-red energy emitted from remote units and for generating data signals responsive thereto;
   c) a single external single-pin bus coupled to said infra-red receiver circuit for propagating said data signals; and
   d) an integrated circuit coupled to said single external single-pin bus for decoding said data signals for an intelligent controller circuit, said integrated circuit comprising:
   an internal bus coupled to said single external single-pin bus;
   a keyboard interface coupled to said internal bus to receive said data signals to identify keyboard data signals, wherein said keyboard interface decodes said keyboard data signals into keyboard control signals for said intelligent controller circuit;
   a mouse interface coupled to said internal bus to receive said data signals and to identify mouse data signals, wherein said mouse interface decodes said mouse data signals into mouse control signals for said intelligent controller circuit; and
   a remote-control interface circuit coupled to said internal bus to receive said data signals and to identify remote-control data signals, wherein said remote-control interface decodes said remote-control data signals into remote-control control signals for said intelligent controller circuit.

7. A set-top-box device as described in claim 6 wherein said intelligent controller circuit is a microprocessor.

8. A set-top-box device as described in claim 6 wherein said intelligent controller circuit is a micro-controller.

9. A set-top-box device as described in claim 6 wherein said remote units comprise: a mouse unit; a keyboard unit; and a remote control unit.

10. A set-top-box device as described in claim 6 wherein said integrated circuit further comprises a PS/2 converter circuit coupled between said single external single-pin bus and said mouse and keyboard interfaces, said PS/2 converter circuit for transforming said mouse and keyboard data signals to signals of the PS/2 communications standard and wherein said mouse data signals and said keyboard data signals both conform to the PS/2 communications standard.

11. A set-top-box device as described in claim 6 wherein media information comprise multi-media data.

12. A set-top-box device as described in claim 11 wherein said multi-media data includes data of a Motion Pictures Expert Group (MPEG) format.

13. A set-top-box device as described in claim 6 wherein said media information comprise an internet channel.

14. A set-top-box device as described in claim 6 wherein said media information comprise information from a cable television channel.

15. A set-top-box device as described in claim 6 wherein said media information comprise information from a satellite television channel.

16. Within an electronic device, a method for receiving infra-red inputs from different remote units and propagating the inputs to an intelligent controller circuit, said method comprising the steps of:

a) said electronic device receiving infra-red energy emitted from said different remote units;

b) generating digital data signals responsive to said infra-red energy;

c) propagating said digital data signals through a single external single-pin bus to an integrated circuit; and d) decoding said digital data signals into device-specific control signals for application to said intelligent controller circuit.

17. The method as recited in claim 16 wherein said different remote units are a mouse unit, a keyboard unit, and a remote control unit.

18. The method as recited in claim 16 wherein step d) further comprises the steps of:

d1) decoding keyboard data signals into keyboard control signals for said intelligent controller circuit;

d2) decoding mouse data signals into mouse control signals for said intelligent controller circuit; and d3) decoding remote-control data signals into remote-control control signals for said intelligent controller circuit.

* * * * *